United States Patent Office 3,098,823
Patented July 23, 1963

3,098,823
LUBRICANTS CONTAINING THICKENERS
PREPARED FROM TALL OIL
Arnold J. Morway, Clark, N.J., assignor to Esso Research
and Engineering Company, a corporation of Delaware
No Drawing. Filed Oct. 3, 1960, Ser. No. 59,861
6 Claims. (Cl. 252—39)

This invention relates to lubricants. Particularly, the invention relates to lubricants having good extreme pressure properties and suitable for high temperature use containing alkaline earth metal salt of $C_2$ to $C_4$ fatty acid and alkaline earth metal soap of tall oil.

Tall oil represents a very low price acid material comprising chiefly a mixture of $C_{18}$ fatty acids, with substantial amounts of rosin acids and minor amounts of unsaponifiables such as sterols, higher alcohols, waxes and hydrocarbons. Tall oil results as a by-product in the formation of kraft paper made from pine wood by the sulfate process. Here pine wood chips are cooked with a strong alkali solution of sodium hydroxide and sodium sulfide which dissolves the lignin and frees the cellulose. At the same time, the alkali solution saponifies fatty and rosin acids in the wood to form sodium soaps which are essentially sodium oleate, sodium linoleate and sodium abietate. The mixture of soaps are separated from the rest of the liquid and is treated with sulfuric acid to form sodium sulfate and the carboxylic acids, i.e. the crude tall oil. The crude tall oil is then decanted and may be further refined by distillation or acid treatment to remove lignin, inorganics, color bodies, etc. In acid refining, the crude tall oil is dissolved in naphtha and treated with concentrated sulfuric acid. An acid sludge forms containing most of the undesirable color and odor bodies which is drawn off. The remaining naphtha solution is then washed with water and alkali solution to remove any residual sulfuric acid, followed by stripping to remove the naphtha to thereby leave a refined tall oil product.

A more complete description of tall oil and its preparation is given in Industrial and Engineering Chemistry, vol. 52, No. 9, pages 726–732.

It has been known to prepare simple soap greases thickened with metal salts of tall oil. However, such compositions are of little commercial value because they are hard and very rubbery. If this simple grease is cut-back with additional oil, in order to overcome its extreme cohesiveness and rubbery characteristics, then fluid thixotropic products are formed which have no grease structure. These diluted products are very unstable and separation of the tall oil soap and oil occur in a relatively short time. If the tall oil soap is employed in combination with soaps of the usual grease-making acids or fats, even in small amounts, it still imparts undesirable cohesive and rubbery characteristics to the composition. In addition, greases thickened with combinations of this type usually have poor structural stability, both thermal and mechanical, and poor lubricating qualities.

Although unsuccessful for grease preparation per se, or when combined with other simple soaps, it has been found that soaps of tall oil can be utilized in combination with salt of $C_2$ to $C_4$ fatty acids, particularly acetic acid or acetic anhydride, to form highly useful lubricating greases. These new greases, particularly when prepared from calcium, are superior to corresponding soap-salt greases prepared from acetate with conventional saturated fatty acids (e.g. stearic acid) in regard to extreme pressure properties, lubrication life, and performance under wet conditions. In addition, the tall oil greases of the invention have excellent thermal stability under static conditions that occur in large bearings where the hub or cap is packed with grease. The grease in the hub is under static conditions and only acts as a reservoir of lubrication. Current soap-salt thickened lubricants tend to harden excessively under this static condition even when the temperature is only mildly elevated (e.g. 150° F.). As the grease hardens and forms a crust, it prevents normal "gun" lubrication and the bearing must be periodically dismantled and cleaned. The grease employing the tall oil fatty acids as a minor portion of the thickener did not cause this excessive hardening and crust formation. Furthermore, soap-salt compositions prepared with the tall oil do not form hard crusts upon storage in drums as occurs when using saturated fatty acids. Another advantage of the tall oil of the invention is its ability to harden under high rates of shear such as frequently occur in ball bearings. Thus, a grease of the invention made up to a number 2 (National Lubricating Grease Institute) consistency will shear harden sufficiently to be pushed out of the ball path. By this action a reservoir of lubricant remains for long periods of excellent lubrication, but does not remain in the ball path where it would be churned, thereby causing excessive power loss and high temperature.

Commercial tall oil generally constitutes mixtures of about 40 to 70 wt. percent $C_{18}$ fatty acid, about 30 to 60 wt. percent of rosin acids and 0.5 to 6.0 wt. percent of sterols, higher alcohols, waxes, hydrocarbons and other unsaponifiables. Of course, tall oil varies in rosin content depending on the geographic location of the pine tree. Tall oil from Virginia pines will have 30 to 35% rosin acids, pines from the Florida area will yield 55 to 60% rosin acids, while the Louisiana pines will yield tall oil of 35 to 40% rosin acids.

The $C_{18}$ fatty acid of the tall oil is a mixture of both cis and trans oleic acids, linoleic acid, linolenic acids and some saturated acids. The rosin acids of the tall oil includes abietic acid, neo-abietic acid, dihydroxy abietic acid, palustric and isodextropimaric acids.

A commercial tall oil, available under the trade name of Emtall from Emery Industries, was used in the working examples of the invention. This material had the following characteristics:

| | |
|---|---|
| Specific gravity at 60° F | 1.00 |
| Pour point, °F | 55 |
| Flash point °F | 420 |
| Fire point, °F | 460 |
| Color—straw to brown. Acid No | 156 |
| Sap. No | 163 |
| Rosin acids No | 78 |
| Fatty acids, wt. percent | 59 |
| Rosin acids, wt. percent | 40 |
| Sterols, higher alcohols etc. wt. percent | 1 |

The alkaline earth metal component of the lubricant can be calcium, strontium, magnesium or barium. Calcium is preferred.

The $C_2$ to $C_4$ fatty acid component can be acetic, propionic or butyric acid. Acetic acid is preferred and can be used in the form of its anhydride.

The thickeners of the invention are preferably prepared by co-neutralizing in lubricating oil, 5.0 to 60.0, preferably 10.0 to 40 mole equivalent proportion of $C_2$ to $C_4$ fatty acid or anhydride per mole equivalent of tall oil, with alkaline earth metal base, followed by heating to temperatures of 250° to 550° F., preferably 300° to 400° F., and more preferably 320° to 350° F., in order to dehydrate the lubricant. Alternatively, no external heating may be applied with the result that the water of reaction is left in the lubricant. In cases where the lubricant is designed for low temperature use this is not objectionable.

The metal base may be an oxide, carbonate or hydroxide of the alkaline earth metal. Calcium hydroxide is preferred.

If desired, preformed metal salt of the $C_2$ to $C_4$ fatty acid and preformed metal soap of the tall oil may be added to oil and heated together, preferably at temperatures of about 300° to 400° F., for 0.5 to 20 hours in order to form the lubricant of the invention. Or preformed metal salt can be added to the oil, and the metal soap of the tall oil can be formed in situ by neutralizing the tall oil with metal base.

The soap-salt thickeners of the invention can also include alkaline earth metal salts and soaps of other acids. For example, salts of about 0.1 to 5.0 mole equivalent proportions of a $C_6$ to $C_{30}$ fatty acid other than tall oil, per mole equivalent of soap of tall oil, can also be present in the finished lubricant. Minor amounts of salts of inorganic acid such as phosphoric acid, nitric acid, hydrochloric acid, etc. can be formed during the co-neutralization step noted above by neutralizing the inorganic acid with alkaline earth metal base.

The finished lubricant will include greases, fluids and semi-fluids comprising a major proportion of lubricating oil and about 2 to 50 wt. percent, preferably 4 to 30 wt. percent of the thickener. To form greases, generally 10 to 30 wt. percent of the material will be soap-salt, while 2 to 10 wt. percent of the soap-salt can be used to form fluid and semi-fluid lubricants.

The lubricating oil may be either a mineral oil or a synthetic oil or a mixture thereof. Such synthetic oils include diesters, complex esters, polysilicones, formals, carbonates, etc.

Various conventional additives may be added to the compositions including oxidation inhibitors such as phenyl α-naphthylamine; rust preventives such as sodium nitrite; other thickeners such as polyethylene, polypropylene, carbon black, metal soaps, etc.

A series of greases was prepared using tall oil and wherein all parts are by weight.

GREASE A

A simple calcium soap grease was prepared using the tall oil as the sole thickening agent. This grease was prepared as follows:

1.8 parts of hydrated lime were added to 81.2 parts of a mineral lubricating oil of 55 SUS viscosity at 210° F. in a steam-jacketed kettle. 15 parts of tall oil (Emtall) was then added and the mixture was stirred while heating to a temperature of 300° F. until the grease was dehydrated. The grease was then allowed to cool to 200° F. where 1 part of water was added to form a grease structure. (Note—Addition of minor amounts of water to a simple calcium soap grease is conventional and necessary in order to form a grease structure.) The resulting grease was very cohesive and rubbery. On attempting to use it for lubrication, it tended to ball up and pull away from the moving parts. On further attempted lubrication use, it began to entrap air and finally became fluid with large oil separation.

GREASE B

A soap-salt thickened grease was prepared wherein the tall oil soap constitutes the major proportion of the soap-salt thickener. This grease was prepared as follows:

71.6 parts of mineral lubricating oil, 6.0 parts of hydrated lime and 16.0 parts of tall oil (Emtall) were intimately mixed in a stream-jacketed kettle. 5.4 parts of acetic anhydride was then slowly added and the temperature rose to 200° F. by the time all the acetic anhydride had been added. External heating was then applied and the temperature of the composition was raised to 320° F. and maintained at this point for about ½ hour, until the grease had become completely dehydrated. 1 part of phenyl α-naphthylamine was added and the grease was then cooled to 100° F. and homogenized in a Morehouse mill operating at 0.003″ clearance. The resulting grease was very cohesive, rubbery and was unsuitable for lubrication.

Example I

Another grease was prepared in the same general manner as Grease B, but utilizing different proportions of ingredients so that the mole equivalent ratio of acetate to tall oil soap was 20.4:1. The composition and properties of this grease are summarized in the following table.

TABLE

Composition (parts by weight), Example I:
- Acetic anhydride _____ 16.60.
- Tall oil _____ 5.48.
- Hydrated lime _____ 13.44.
- Phenyl α-naphthylamine _____ 0.87.
- Mineral lubricating oil of 55 SUS at 210° F _____ 63.55.

Properties:
- Appearance _____ Excellent.
- Dropping point, ° F _____ 500+.
- Penetration, 77° F., mm/10—
  - Unworked _____ 308.
  - Worked, 60 strokes _____ 316.
  - Worked, 10,000 strokes _____ 326.
- Water washing test, percent loss _____ 5.0.
- Solubility in boiling water _____ Nil.
- Wheel bearing test, 1 hr. tilted at 220° F _____ No slump and no leakage.
- Norma Hoffmann oxidation test, hrs. to 5 p.s.i. drop in $O_2$ pressure _____ 450.
- Shaker test, ½ hour—
  - Micro penetration original _____ 182.
  - Micro penetration after shaking __ 182.
- Lubrication life in hours [1] (250° F., 10,000 r.p.m.) _____ 2000+.
- Almen test wgts. carried—
  - Gradual loading _____ 15.
  - Shock loading _____ 15.
  - Pin condition after each test ____ Unchanged.
- Timken test in lbs _____ 55+.
- 4-ball wear test, scar diam. in mm. (1800 r.p.m., 10 kg. load, 75° F., 1 hr.) _____ 0.23.

[1] ABEC-NLGI spindle test.

As seen by the preceding table, the composition of the invention formed an excellent high temperature grease which was stable, water resistant, oxidation resistant and having good extreme pressure and antiwear properties. The water washing test of the table was carried out according to the Military Specification MIL-G-3278 for low temperature aviation greases. The shaker test was carried out by putting samples of the grease in a mechanical shaker and then measuring any change in penetration. The purpose of this test is to determine the structural stability of the grease when subjected to mechanical movement such as may occur during shipping. The other tests described above are standard in the art.

While the example of the invention illustrates a thickener formed solely from the acetic anhydride and the tall oil, other acids can be included as previously mentioned. To illustrate this concept, Example I can be repeated, but in which 5 parts by weight of caproic acid is also neutralized in situ along with the tall oil, and using of course a larger amount of hydrated lime in order to complete the neutralization of all the acids.

What is claimed is:

1. A lubricant comprising a major amount of lubricating oil and about 2 to 50 wt. percent of a soap-salt thickener, said thickener consisting essentially of alkaline earth metal salt of about 5 to 60.0 molar proportions of $C_2$ to $C_4$ fatty acid per one molar proportion of alkaline earth metal soap of tall oil.

2. A lubricant according to claim 1, wherein said alkaline earth metal is calcium.

3. A lubricant according to claim 1, wherein said salt of $C_2$ to $C_4$ fatty acid is salt of acetic acid.

4. A lubricant according to claim 1, wherein the molar proportion of salt of $C_2$ to $C_4$ fatty acid to soap of tall oil is about 10:1 to 40:1.

5. A lubricant comprising a major amount of lubricating oil; and within the range of about 2 to 50 wt. percent of alkaline earth metal salt of $C_2$ to $C_4$ fatty acid and alkaline earth metal soap of tall oil; in a molar ratio of about 5 to 60 molar proportions of salt of said fatty acid per molar proportion of soap of said tall oil.

6. A lubricant according to claim 5, wherein said lubricating oil is mineral lubricating oil, said alkaline earth metal is calcium, said salt of fatty acid is salt of acetic acid, and the molar proportion of salt is about 10 to 40 molar proportions per molar proportion of said soap.

References Cited in the file of this patent

UNITED STATES PATENTS

| | | |
|---|---|---|
| 2,417,432 | McLennan | Mar. 18, 1947 |
| 2,909,485 | Beerbower et al. | Oct. 20, 1959 |